(12) United States Patent
Blackshear, Jr.

(10) Patent No.: US 7,841,129 B2
(45) Date of Patent: Nov. 30, 2010

(54) SNAG-PROOF MULTI-PURPOSE FISHING TACKLE

(76) Inventor: C Walter W. Blackshear, Jr., 3000 Quail Hollow Cr, Baytown, TX (US) 77521

( * ) Notice: Subject to any disclaimer, the term of this patent is extended or adjusted under 35 U.S.C. 154(b) by 168 days.

(21) Appl. No.: 12/287,238

(22) Filed: Oct. 8, 2008

(65) Prior Publication Data

US 2010/0083560 A1 Apr. 8, 2010

(51) Int. Cl.
*A01K 97/02* (2006.01)
*A01K 95/00* (2006.01)

(52) U.S. Cl. .................... 43/44.99; 43/43.1; 43/43.15; 43/42.74

(58) Field of Classification Search ............... 43/43.1, 43/44.99, 42.06, 42.74, 43.15
See application file for complete search history.

(56) References Cited

U.S. PATENT DOCUMENTS

| | | | | |
|---|---|---|---|---|
| 2,157,003 A | * | 5/1939 | Mussina | 43/42.74 |
| 2,289,663 A | * | 7/1942 | Linhares | 43/42.74 |
| 2,382,677 A | * | 8/1945 | Thomas | 43/43.15 |
| 2,605,576 A | * | 8/1952 | Young, Jr. et al. | 43/43.1 |
| 2,614,358 A | * | 10/1952 | Adams | 43/44.99 |
| 2,710,480 A | * | 6/1955 | Gehrig | 43/43.15 |
| 2,729,912 A | * | 1/1956 | Moffett | 43/44.99 |
| 2,759,291 A | * | 8/1956 | Foglio | 43/43.15 |
| 2,841,911 A | * | 7/1958 | Dahlgren | 43/43.12 |
| 2,877,594 A | * | 3/1959 | Birrell | 43/42.74 |
| 2,906,055 A | * | 9/1959 | Valentine | 43/44.99 |
| 2,941,327 A | * | 6/1960 | Rundell | 43/44.99 |
| 2,975,541 A | * | 3/1961 | Birrell | 43/43.15 |
| 2,979,853 A | * | 4/1961 | Erving | 43/44.99 |
| 2,985,981 A | * | 5/1961 | King | 43/44.97 |
| 3,084,471 A | * | 4/1963 | Alspaugh | 43/44.99 |
| 3,105,318 A | * | 10/1963 | Birrell | 43/43.15 |
| 3,183,620 A | * | 5/1965 | Dockal | 43/42.74 |
| 3,190,029 A | * | 6/1965 | Bondi | 43/42.74 |
| 3,670,447 A | * | 6/1972 | Wohead | 43/43.14 |
| 3,744,178 A | * | 7/1973 | Denny | 43/42.74 |
| 3,769,740 A | * | 11/1973 | Lang | 43/44.99 |
| 3,785,078 A | * | 1/1974 | Seitz | 43/43.14 |
| 3,820,270 A | * | 6/1974 | La Force | 43/43.14 |
| 3,841,013 A | * | 10/1974 | Sabagonis | 43/43.15 |
| 3,852,906 A | * | 12/1974 | LaForce | 43/43.14 |
| 3,897,649 A | * | 8/1975 | Jorgensen | 43/43.15 |
| 3,974,591 A | * | 8/1976 | Ray | 43/44.99 |

(Continued)

*Primary Examiner*—Darren W Ark
(74) *Attorney, Agent, or Firm*—Buskop Law Group, PC; Wendy Buskop

(57) ABSTRACT

A snag-proof multi-purpose fishing weight apparatus combined with fish hook and a fish attractant/fish feeding stimulant delivery system generally comprises a slender tubular hollow shaft with small holes along its length which can be filled with fish attractant/feeding stimulant and then seep or ooze out of the small holes along the shaft into the surrounding water. The shaft has attached to it on one end (top) a flotation device and a flexible wire to which is attached a fish hook and main fishing line. The other end of the shaft (bottom), has a weight of the same diameter as the shaft and attached to it and extending from it on the same plane creating a smooth extension of the shaft. This configuration, underwater will naturally orient the apparatus in the upright vertical position with the float end and fish hook on top and the weighted end resting on bottom, while positioning the baited hook outward and away from shaft in view of foraging fish.

10 Claims, 2 Drawing Sheets

U.S. PATENT DOCUMENTS

| | | | | |
|---|---|---|---|---|
| 3,991,505 A * | 11/1976 | Simeti | | 43/42.74 |
| 4,021,959 A * | 5/1977 | Antkowiak | | 43/42.74 |
| 4,138,794 A * | 2/1979 | Chiodini | | 43/44.99 |
| 4,139,960 A * | 2/1979 | Chojnowski | | 43/43.1 |
| 4,232,471 A * | 11/1980 | Kolk et al. | | 43/44.99 |
| 4,357,775 A * | 11/1982 | Click | | 43/42.74 |
| 4,638,588 A * | 1/1987 | Abadie | | 43/44.99 |
| 4,649,662 A * | 3/1987 | Tharp et al. | | 43/43.14 |
| 4,679,349 A * | 7/1987 | Birchfield | | 43/44.97 |
| 4,685,242 A * | 8/1987 | Stanish | | 43/44.99 |
| 4,693,030 A * | 9/1987 | Wohead | | 43/43.1 |
| 4,793,091 A * | 12/1988 | Cerny | | 43/42.74 |
| 5,054,227 A * | 10/1991 | Lin | | 43/43.12 |
| 5,123,201 A * | 6/1992 | Reiter | | 43/107 |
| 5,349,777 A * | 9/1994 | Pallay et al. | | 43/44.99 |
| 5,375,365 A * | 12/1994 | Bronder | | 43/43.12 |
| 5,461,821 A * | 10/1995 | Carter, Jr. | | 43/43.12 |
| 5,608,985 A * | 3/1997 | Kainec | | 43/43.15 |
| 5,617,669 A * | 4/1997 | Levey | | 43/44.99 |
| 6,145,240 A * | 11/2000 | Adams et al. | | 43/43.1 |
| 6,145,243 A * | 11/2000 | Wigton et al. | | 43/139 |
| 6,305,121 B1 * | 10/2001 | Adams et al. | | 43/44.96 |
| 6,484,435 B1 * | 11/2002 | Mosher | | 43/43.1 |
| 6,513,279 B1 * | 2/2003 | Hernandez | | 43/44.99 |
| 6,530,171 B2 * | 3/2003 | Stevens et al. | | 43/44.99 |
| 6,557,294 B2 * | 5/2003 | Adams et al. | | 43/44.96 |
| 6,655,073 B2 * | 12/2003 | Mosher | | 43/43.1 |
| 6,840,003 B2 * | 1/2005 | Moore | | 43/113 |
| 6,843,018 B2 * | 1/2005 | Adams et al. | | 43/44.96 |
| 6,874,272 B1 * | 4/2005 | Adams et al. | | 43/44.96 |
| 6,877,268 B2 * | 4/2005 | Kutzner | | 43/44.89 |
| 7,520,086 B2 * | 4/2009 | Melhorn et al. | | 43/44.99 |
| 7,621,070 B2 * | 11/2009 | Brasseur | | 43/43.1 |
| 2003/0151006 A1 * | 8/2003 | Dykstra | | 250/493.1 |
| 2005/0284018 A1 * | 12/2005 | Yonker et al. | | 43/132.1 |
| 2006/0218848 A1 * | 10/2006 | Melhorn et al. | | 43/44.99 |
| 2006/0218851 A1 * | 10/2006 | Weiss et al. | | 43/113 |
| 2007/0199235 A1 * | 8/2007 | Yu | | 43/44.99 |
| 2008/0040966 A1 * | 2/2008 | Stone et al. | | 43/42.74 |
| 2008/0060254 A1 * | 3/2008 | Bloomfield | | 43/42.74 |
| 2009/0077860 A1 * | 3/2009 | Stone et al. | | 43/42.74 |
| 2009/0249679 A1 * | 10/2009 | Huppert | | 43/44.99 |
| 2010/0139148 A1 * | 6/2010 | Barker | | 43/44.99 |

* cited by examiner

SNAG-PROOF MULTI-PURPOSE FISHING TACKLE

BACKGROUND OF THE INVENTION

1. Field of the Invention

The present invention relates to a multi-purpose fishing tackle apparatus, and more specifically, an apparatus which is designed for fishing on or near the bottom which is snag-proof and has a weighted sinker, a connecting wire with a fish hook and/or a lure, a float and a perforated tubular shaft for the dispersing of fish attractant or chum. The weight, float, shaft, connecting wire and fish hook are specifically assembled into a configuration that will accomplish its multiple purpose functions which are to:

A.) to provide a bottom fishing apparatus that is snag-proof

B.) to carry and disperse fish attractant/chum

C.) to carry the baited fish-hook and/or lure to the bottom

D.) to prevent "live bait" from swimming into cracks and crevices or under debris to hide from foraging fish and increase the risk of snagging.

E.) to provide an apparatus that when assembled into its useful configuration will naturally orient itself into a vertically upright position having the ability to fulfill its intended purposes as described above.

2. Description of Related Art

Fishing is a very popular sport enjoyed by many professional and recreational anglers. There are various methods of fishing for the many different species of fish in various bodies of water that require a variety of fishing equipment, techniques and rigging of tackle. One method in particular is fishing on or near the bottom.

This is usually accomplished by attaching a weight to the end of a fishing line to which either a baited hook or fishing lure is attached such that the weight will carry the baited hook or lure to the bottom of the body of water to catch bottom feeding fish. In many cases there are rocks, logs, shell, and other types of debris on the bottom that presents a number of problems to this method of fishing.

One problem is that either the weight or fish hook or both become snagged in a crevice between rocks or gets caught on a log or other underwater debris and very often results in a broken fishing line and loss of expensive fishing tackle.

Another problem is that when fishing on or near the bottom using "live bait" such as shrimp, minnows, or other small fish, the "live bait" will swim down to the bottom to hide under debris or into crevices between rooks and be hidden from foraging fish and also increase the chance of getting snagged and breaking the line.

Still another problem with this method of fishing is that when using certain types of "dough" baits that contain attractant scents such as chicken blood, grasshopper, worms, or a variety of other flavors, the bait does not stay on the hook very well and lessens the chance of catching fish. Some ways of dealing with these various types of problems are to use a snag-proof fishing weight, weed guards to protect the fish hooks from snagging, and to use various types of containers that can carry scented fish attractants to the immediate area where fishing is done.

Several devices of this type have been disclosed in prior art. These have included fishing weights of different shapes and sizes and different means of attachment to a fishing line, and some that incorporate a buoyant element with the weight in an attempt to create a snag-proof apparatus, and some with perforated hollow containers for delivering chum/fish attractant of various configurations cited below:

U.S. Pat. No. 4,232,471 issued Nov. 11, 1980 to Kolk and Haraka

U.S. Pat. No. 3,084,471 issued April, 1963 to Alspaugh

U.S. Pat. No. 6,513,279 issued Feb. 4, 2003 to Hernandez

U.S. Pat. No. 6,557,294 issued May 6, 2003 to Adams and Lindner

U.S. Pat. No. 6,843,018 issued Jan. 18, 2005 to Adams and Lindner

U.S. Pat. No. 6,877,268 issued Apr. 12, 2005 to Kutzner

However, none of the prior art discloses a snag-proof multi-purpose fishing weight with a hollow shaft for fish attractant, a permanent weight attached to one end of the shaft, and a float and fish hook connecting wire connected to the other end of shaft that when underwater will naturally orient itself in the vertical upright position while holding the lure or baited hook in a position away from shaft in full view of foraging fish and prevent snagging on debris, and simultaneously dispensing fish attracting chum. None of the above inventions and patents, taken either singly or in combination, is seen to describe the instant invention as claimed herein.

SUMMARY OF THE INVENTION

The present invention relates to a snag-proof multi-purpose fishing apparatus that is useful in many situations but is specifically designed to be used by fishermen for fishing on or near the bottoms of various bodies of water, and more specifically a fishing apparatus consisting of a weighted sinker, a fish hook, a float, a hollow perforated shaft, and a connecting wire for attaching to fishing line and more specifically, a snag-proof multi-purpose fishing apparatus that when assembled into a specific configuration, will perform its intended useful functions underwater naturally orienting itself into a vertically upright position with the weighted end resting on bottom, the perforated hollow shaft filled with fish attracting chum standing vertically with the float atop vertical shaft from, which extends a connecting wire terminating in a looped eyelet to which is connected a fish hook and/or lure and the main fishing line and which this configuration in its entirety will prevent and/or minimize the apparatus from snagging on rocks, logs, and other debris that very often results in broken line and loss of expensive fishing tackle. Accordingly it is a principle object of the invention to provide a snag-proof multi-purpose fishing apparatus that can be easily manufactured and used by all anglers on all fishing rods and reels and to be made from environmentally harmless materials.

It is also an object of the invention described herein to provide a hollow perforated tubular shaft for the containment and dispersion of fish attracting chum.

It is a further object of said invention to provide a tubular weight permanently attached by shaft to provide the weight necessary to sink apparatus to bottom.

It is still another object of said invention to provide a float attached to top end opposite to weighted end of said shaft to buoyantly support said shaft into vertically upright position with weighted end on bottom.

It is yet another object of invention to provide a connecting wire extending from top of said shaft terminating in a looped eyelet for the attachment of apparatus in its entirety to the fishing line and to which a baited fish hook and/or lure may be attached.

Still another object of the invention is for the connecting wire to be of sufficient length to hold baited hook far enough away from said shaft to prevent hook from entangling on shaft when being retrieved.

Another object of the invention is to provide a connecting wire extending from top of said shaft that will hold "live bait" such as shrimp, minnows, and other such small fish such that when placed on hook will prevent such "live bait" from being able to swim down and into crevices of rocks and other debris to hide from foraging fish by keeping them buoyantly supported at a distance above the bottom so as to be in plain view of foraging fish.

It is also an object of said invention to provide a fishing apparatus that when assembled into its specific configuration will naturally orient itself underwater in a vertically upright position with weighted end resting on bottom, perforated hollow tubular shaft positioned vertically, with the float atop said shaft with connecting wire attached to fishing line and baited hook while exhibiting the ability to avoid snagging on rocks and other debris that would often result in broken line and loss of expensive tackle, and therefore it is an object of the invention to provide improved elements and arrangements thereof in an apparatus for the purposes described which is inexpensive, dependable, and fully effective in accomplishing its intended purposes.

These and other objects of the present invention will become readily apparent upon further review of the following specification and drawings.

DETAILED DESCRIPTION OF THE PREFERRED EMBODIMENTS

Figure 1:
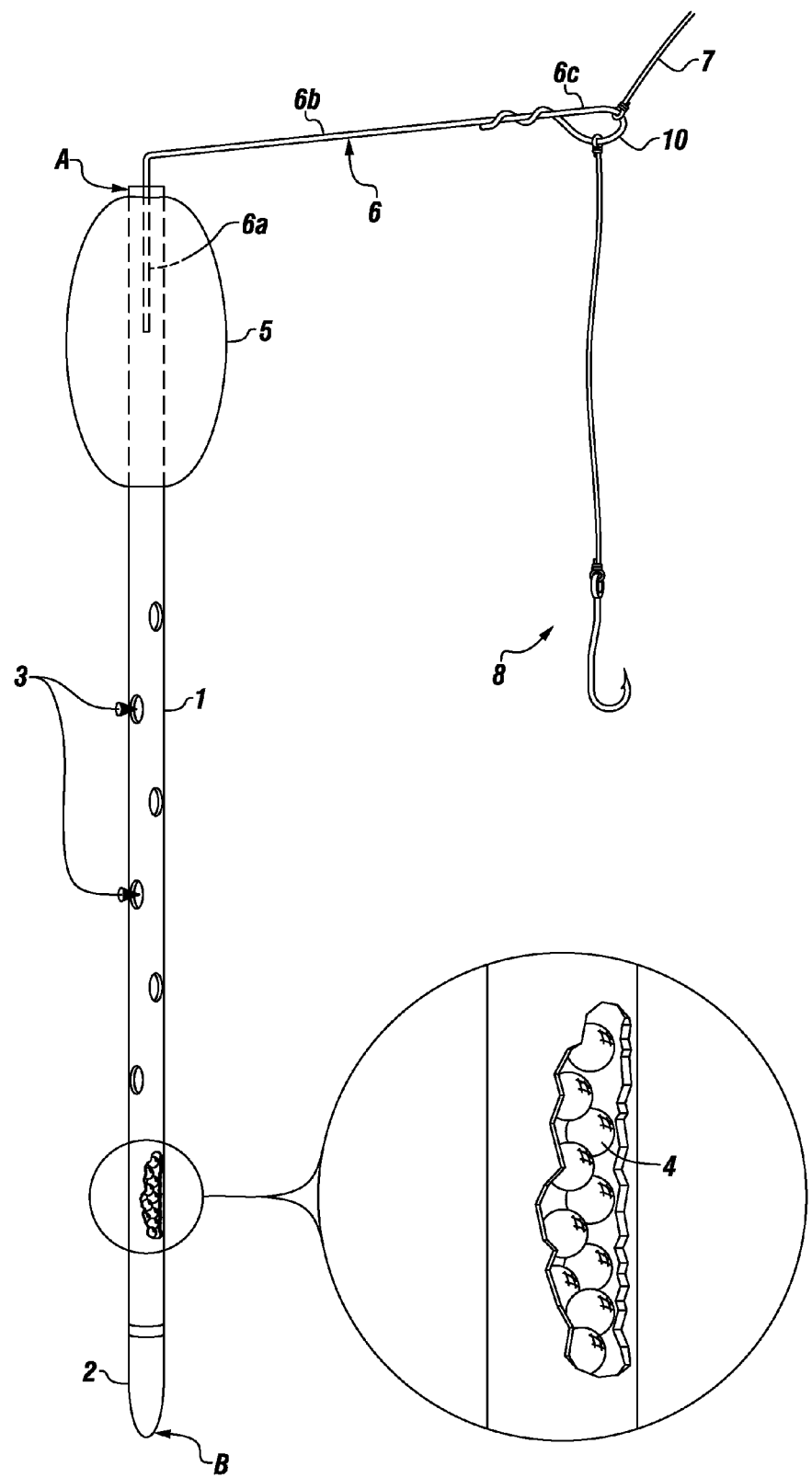
FIG. 1. is an environmental view of the snag-proof multi-purpose fishing apparatus.
Figure 2:
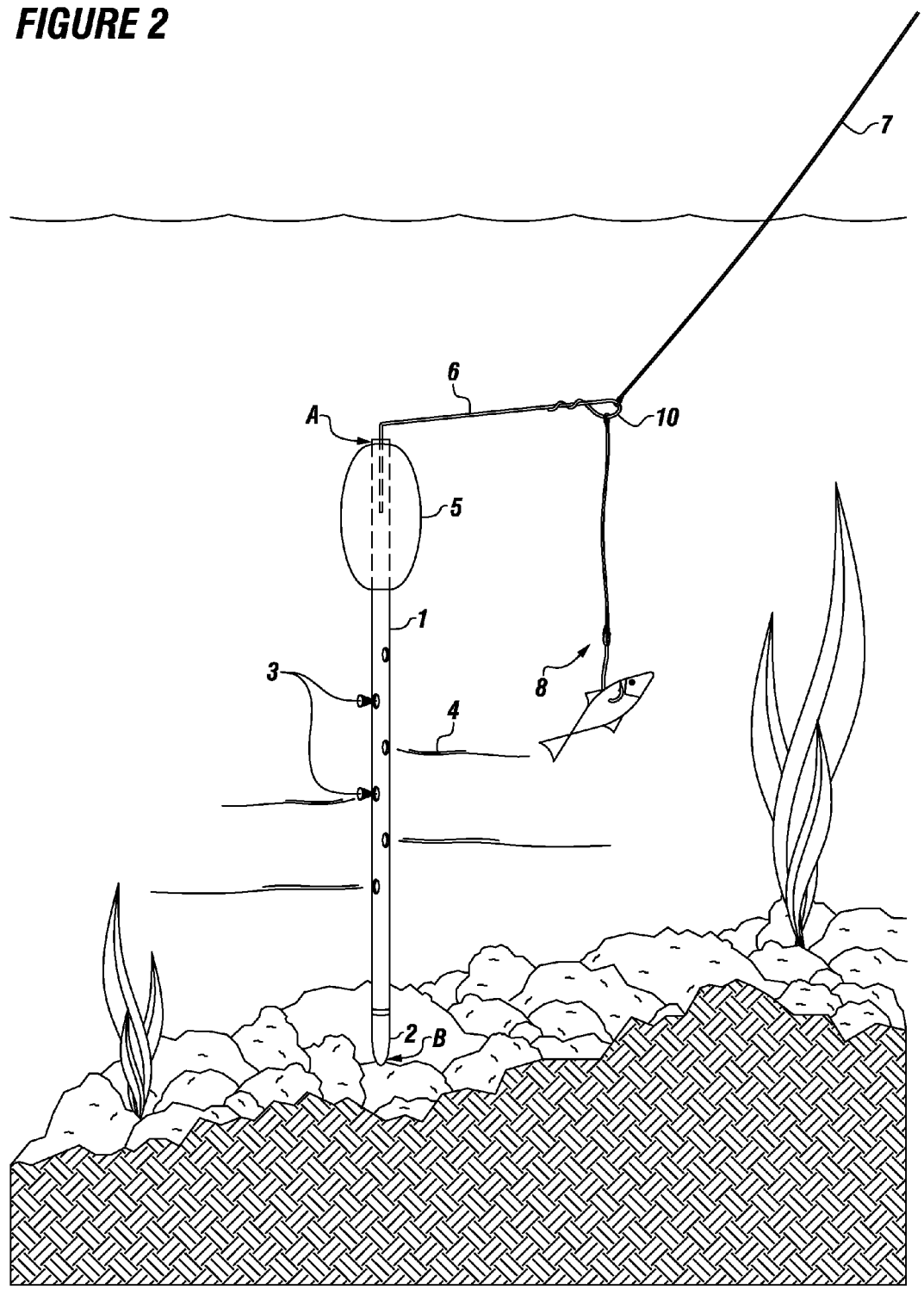
FIG. 2. is a side view of the snag-proof multi-purpose fishing apparatus.

Referring to the drawings, FIG. 1. illustrates the snag-proof multi-purpose fishing apparatus which is useful in many situations but which is specifically adapted to be used by fishermen when fishing on or near the bottom of bodies of water for bottom feeding fish and being assembled in a specific configuration comprising a weighted sinker 2, a hollow perforated shaft 1 for the containment and dispersion of fish attracting chum 4, a float 5, and connecting wire 6 for the attachment to a fishing line 7, and a fish hook 8, and/or lure 8, and being assembled such a configuration such that when underwater will naturally orient itself in a vertically upright position with weighted end B downward resting on bottom with hollow perforated shaft 1 positioned vertically with float 5 and connecting wire 6 atop said shaft 1 with said connecting wire 6 extending out and away from said shaft 1 to prevent entangling with said shaft 1 and hold baited fish hook 8 in a position outward from shaft and above said bottom to keep the bait in plain view of foraging fish and to prevent "live bait", shrimp, minnows, or other small bait fish from swimming down among the cracks and crevices of rocks and other underwater debris to hide from foraging predator fish where they could increase the chance of snagging the fishing line that often results in a broken line and loss of expensive fishing tackle.

The vertical shaft 1 is formed of solid material, wood, graphite composite, plastic, or preferably a hollow lightweight metal, or other suitable material and having permanently attached to it at one end a weight 2 which is inserted into said shaft 1 and extending outward there from in such a way to present a smooth transitional surface at the point of connection to prevent snagging. The hollow shaft 1 has small holes 3 along its entire length to allow shaft 1 and the diffusion of the chum 4 out of said shaft 1 into surrounding water.

To the top of said shaft 1 is attached a float 5 of sufficient buoyancy to hold shaft 1 in vertically upright position but will not lift the apparatus in its entirety off the bottom and will naturally orient itself in the vertical upright position when at rest on bottom with weighted end 2 on bottom B and float end 5 oriented toward the top A. Also attached to top of shaft 1 is a connecting wire 6 having a first end, a second end, and an intermediate section therebetween. A first end of the connecting wire 6a attached to the top of the shaft 1 by being fixed inside of the hollow tubular shaft, an intermediate section 6b extending from shaft 1 and terminating at a second end 6c in a looped eyelet 10 to which is attached a fish hook with leader line 8 and to which is also connected the fishing line 7.

I claim:

1. A snag-proof multi-purpose fishing apparatus for use by fishermen for fishing on or near the bottoms of various bodies of water, the snag-proof multi-purpose fishing apparatus comprising:
   a. a hollow tubular shaft with holes disposed along an entire length of the hollow tubular shaft for the containment and dispersion of a fish attracting chum or a fish attractant;
   b. a tubular weighted sinker permanently inserted into an affixed to one end of the hollow tubular shaft and extending outwards therefrom, wherein the tubular weighted sinker provides a weight necessary to carry and sink the snag-proof multi-purpose fishing apparatus to a bottom of a body of water, and wherein the tubular weighted sinker has a diameter that is the same as a diameter of the hollow tubular shaft providing a smooth transitional surface at the affixment of the tubular weighted sinker to the tubular hollow shaft;
   c. a float attached to a top of the hollow tubular shaft opposite the tubular weighted sinker of sufficient buoyancy to orient and support the hollow tubular shaft underwater in a vertically upright position;
   d. a flexible connecting wire with a first end, a second end, and an intermediate section therebetween, the first end of the wire attached to the top of the hollow tubular shaft by being fixed inside of the hollow tubular shaft, the intermediate section extending outwardly and away from the hollow tubular shaft, wherein the flexible connecting wire terminates at the second end in a looped eyelet opposite the hollow tubular shaft; and
   e. a fish hook, a lure, or combinations thereof on a leader line attached to the looped eyelet of the flexible connecting wire, wherein the flexible connecting wire is a sufficient length to position and hold the fish hook, the lure, or combinations thereof away from the hollow tubular shaft to prevent the fish hook, the lure, or combinations thereof from entangling on the hollow tubular shaft, and wherein the flexible connecting wire and the leader line keep the fish hook, the lure, or combinations thereof buoyantly supported at a distance above the bottoms of the bodies of water.

2. The snag-proof multi-purpose fishing apparatus of claim 1, wherein the hollow tubular shaft is filled with the fish attractant or the fish attracting chum, and wherein the holes disposed along the entire length of the hollow tubular shaft disperse the fish attractant or the fish attracting chum.

3. The snag-proof multi-purpose fishing apparatus of claim 1, wherein the hollow tubular shaft is lightweight, slender, or combinations thereof.

4. The snag-proof multi-purpose fishing apparatus of claim 1, wherein the hollow tubular shaft is formed of a solid material, a wood, a graphite composite, a plastic, or a lightweight metal.

5. The snag-proof multi-purpose fishing apparatus of claim 1, wherein the fish hook, the lure, or combinations thereof is baited.

6. The snag-proof multi-purpose fishing apparatus of claim 1, further comprising a fishing line from a fishing pole connected to the looped eyelet of the flexible connecting wire.

7. The snag-proof multi-purpose fishing apparatus of claim 6, wherein the fish hook, the lure, or combinations thereof is baited.

8. The snag-proof multi-purpose fishing apparatus of claim 7, wherein the hollow tubular shaft is filled with the fish attractant or the fish attracting chum, and wherein the holes disposed along the entire length of the hollow tubular shaft disperse the fish attractant or the fish attracting chum.

9. The snag-proof multi-purpose fishing apparatus of claim 8, wherein the hollow tubular shaft is lightweight, slender, or combinations thereof.

10. The snag-proof multi-purpose fishing apparatus of claim 9, wherein the hollow tubular shaft is formed of a solid material, a wood, a graphite composite, a plastic, or a lightweight metal.

* * * * *